US012808103B2

(12) United States Patent
Wang et al.

(10) Patent No.: US 12,808,103 B2
(45) Date of Patent: Nov. 24, 2026

(54) ELECTRET MELT-BLOWN WEBS WITH IMPROVED FILTRATION PROPERTIES

(71) Applicant: BOREALIS AG, Vienna (AT)

(72) Inventors: Jingbo Wang, Linz (AT); Markus Gahleitner, Linz (AT); Klaus Bernreitner, Linz (AT); Joachim Fiebig, Linz (AT); Henk Van Paridon, Beringen (BE); Wilhelmus Sars, Geleen (NL); Gustaf Tobieson, Stenungsund (SE); Pauli Leskinen, Porvoo (FI)

(73) Assignee: BOREALIS AG, Vienna (AT)

( * ) Notice: Subject to any disclaimer, the term of this patent is extended or adjusted under 35 U.S.C. 154(b) by 569 days.

(21) Appl. No.: 18/260,506

(22) PCT Filed: Jan. 21, 2022

(86) PCT No.: PCT/EP2022/051358
§ 371 (c)(1),
(2) Date: Jul. 6, 2023

(87) PCT Pub. No.: WO2022/157319
PCT Pub. Date: Jul. 28, 2022

(65) Prior Publication Data

US 2024/0301602 A1 Sep. 12, 2024

(30) Foreign Application Priority Data

Jan. 21, 2021 (EP) .................................... 21152815

(51) Int. Cl.

| | |
|---|---|
| ***D04H 3/16*** | (2006.01) |
| ***B01D 39/16*** | (2006.01) |
| ***C08F 110/06*** | (2006.01) |
| ***C08K 5/098*** | (2006.01) |
| ***C08K 5/20*** | (2006.01) |
| ***D01F 1/10*** | (2006.01) |
| ***D01F 6/06*** | (2006.01) |
| ***D04H 1/4291*** | (2012.01) |
| ***D06M 10/00*** | (2006.01) |
| ***D06M 101/20*** | (2006.01) |

(52) U.S. Cl.
CPC ........... *D04H 3/16* (2013.01); *B01D 39/1623* (2013.01); *C08F 110/06* (2013.01); *C08K 5/098* (2013.01); *C08K 5/20* (2013.01); *D01F 1/10* (2013.01); *D01F 6/06* (2013.01); *D04H 1/4291* (2013.01); *D06M 10/00* (2013.01); *B01D 2239/0435* (2013.01); *B01D 2239/0622* (2013.01); *B01D 2239/10* (2013.01); *C08F 2420/10* (2021.01); *C08F 2810/10* (2013.01); *C08K 2201/014* (2013.01); *D06M 2101/20* (2013.01); *D06M 2200/00* (2013.01); *D10B 2321/022* (2013.01); *D10B 2401/04* (2013.01); *D10B 2505/04* (2013.01)

(58) Field of Classification Search
CPC ........ D04H 3/16; D04H 1/4291; B01D 39/16; B01D 39/1623; D01F 1/10; D01F 6/06
See application file for complete search history.

(56) References Cited

U.S. PATENT DOCUMENTS

| | | | | |
|---|---|---|---|---|
| 5,620,785 | A | 4/1997 | Watt et al. | |
| 10,036,107 | B2 | 7/2018 | Berkemann et al. | |
| 2001/0045086 | A1 | 11/2001 | Cox et al. | |
| 2008/0160862 | A1 * | 7/2008 | Sartori | D04H 3/16 525/240 |
| 2009/0259009 | A1 | 10/2009 | Fuchs et al. | |
| 2011/0290119 | A1 | 12/2011 | Ylitalo et al. | |
| 2012/0116338 | A1 | 5/2012 | Ferry et al. | |
| 2013/0288555 | A1 | 10/2013 | Berkemann et al. | |
| 2015/0218355 | A1 * | 8/2015 | Hemmeter | C08L 23/142 521/91 |
| 2015/0233030 | A1 * | 8/2015 | Liba | G10K 11/162 181/294 |
| 2017/0121875 | A1 * | 5/2017 | Schultz | D01F 1/10 |
| 2019/0169409 | A1 * | 6/2019 | Wang | C08L 23/12 |
| 2019/0301055 | A1 * | 10/2019 | Wang | D04H 1/544 |
| 2024/0084103 | A1 * | 3/2024 | Wang | D04H 3/007 |

FOREIGN PATENT DOCUMENTS

| | | | |
|---|---|---|---|
| CN | 106471045 | A | 3/2017 |
| CN | 111548553 | A | 8/2020 |
| EP | 0887379 | B1 | 12/1998 |
| EP | 2532687 | A2 | 12/2012 |
| KR | 10-2012-0006528 | U | 9/2012 |
| KR | 20190052643 | A | 5/2019 |
| WO | 92/12182 | A1 | 7/1992 |
| WO | 94/14856 | A1 | 7/1994 |

(Continued)

OTHER PUBLICATIONS

Chinese Application No. 202280009216.7, Office Action dated Jun. 21, 2025.

(Continued)

*Primary Examiner* — Robert Clemente

(74) *Attorney, Agent, or Firm* — Tarolli, Sundheim, Covell & Tummino LLP

(57) ABSTRACT

Electret melt-blown webs made from a polypropylene composition (PC) comprising a propylene homopolymer (HPP) having: a. a melt flow rate $MFR_2$ in the range from 400 to 5000 g/10 min, b. a melting temperature Tm, in the range from 140 to 160° C., and c. a content of 2, 1 erythro regiodefects in the range from 0.01 to 1.5 mol %.

15 Claims, 1 Drawing Sheet

(56) References Cited

FOREIGN PATENT DOCUMENTS

| | | | | | |
|---|---|---|---|---|---|
| WO | 95/12622 | A1 | | 5/1995 | |
| WO | 99/24478 | A1 | | 5/1999 | |
| WO | 99/24479 | A1 | | 5/1999 | |
| WO | 00/68315 | A1 | | 11/2000 | |
| WO | 2003/051934 | A1 | | 6/2003 | |
| WO | 2004/000899 | A1 | | 12/2003 | |
| WO | 2004/111095 | A1 | | 12/2004 | |
| WO | 2006/097497 | A1 | | 9/2006 | |
| WO | 2007/088204 | A2 | | 8/2007 | |
| WO | WO-2011092092 | A2 | * | 8/2011 | ............. D04H 3/007 |
| WO | WO-2012100974 | A1 | * | 8/2012 | ............. D04H 1/541 |
| WO | 2015/082379 | A1 | | 6/2015 | |
| WO | 2020/064313 | A1 | | 4/2020 | |

OTHER PUBLICATIONS

Korean Application No. 10-2023-7026680, Office Action dated Aug. 19, 2025.

Gurmeet Singh, et al., “Triad sequence determination of ethylene-propylene copolymers—application of quantitative 13C NMR” Polymer Testing 28 (2009) 475-479.

H.N. Cheng, “13C NMR Analysis of Ethylene-Propylene Rubbers”, Macromolecules 1984, 17, 1950-1955.

Kakugo, Masahori, et al., 13C NMR Determination of Monomer Sequence Distribution in Ethylene-Propylene Copolymers Prepared with d-TiC13—Al(C2H5)2Cl.

Resconi, Luigi, et al. “Selectivity in Propene Polymerization with Metallocene Catalysts” Chem Rev. 2000, 100, 1253-1345.

Vincent Busico, et al., “Alk-1-ene Polymerization in the Presence of a Monocyclopentadienyl Zirconium(IV) Acetamidinate Catalyst: Microstructural and Mechanistic Insights”, Macromol. Rapid Commun. 2007, 28, 1128-1134.

Wen-Jun Wang, et al., “Structural Analysis of Ethylene/Propylene Copolymers Synthesized with a Constrained Geometry Catalyst” Macromolecules 2000, 33, 1157-1162.

Zhe Zhou, et al., “A new decoupling method for accurate quantification of polyethylene copolymer composition and triad sequence distribution with 13C NMR” Journal of Magnetic Resonance 187 (2007) 225-233.

Zweifel, Hans, Plastics Additives Handbook, 5th Edition, 2001, 956-965.

European Application No. 21152815.3, Extended Search Report dated Sep. 28, 2021.

Egyptian Application No. EG/P/2023/01034, Office Action dated Jun. 11, 2025.

United Arab Emirate Application No. P6001724/2023, Search Report dated May 26, 2025.

United Arab Emirate Application No. P6001724/2023, Office Action dated May 26, 2025.

Korean Application No. 10-2023-7026680, Notice of Allowance dated Jun. 24, 2026.

Indian Application No. 202317052542, Office Action dated Jul. 23, 2026.

* cited by examiner

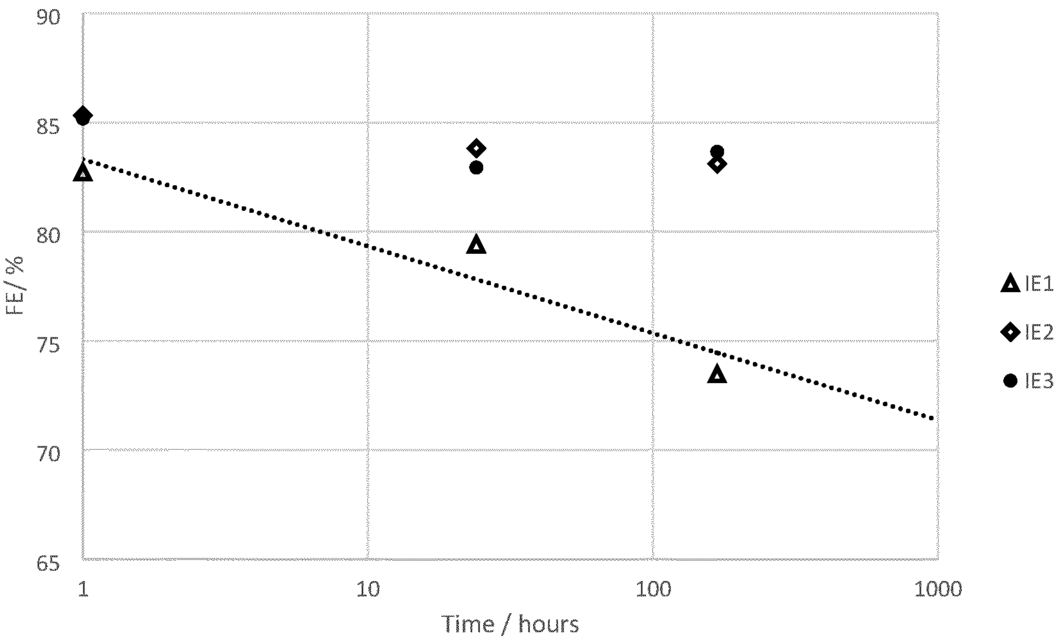
Figure 1: Filtration efficiency of inventive electret melt-blown webs at 1, 24 and 168 hours after charging
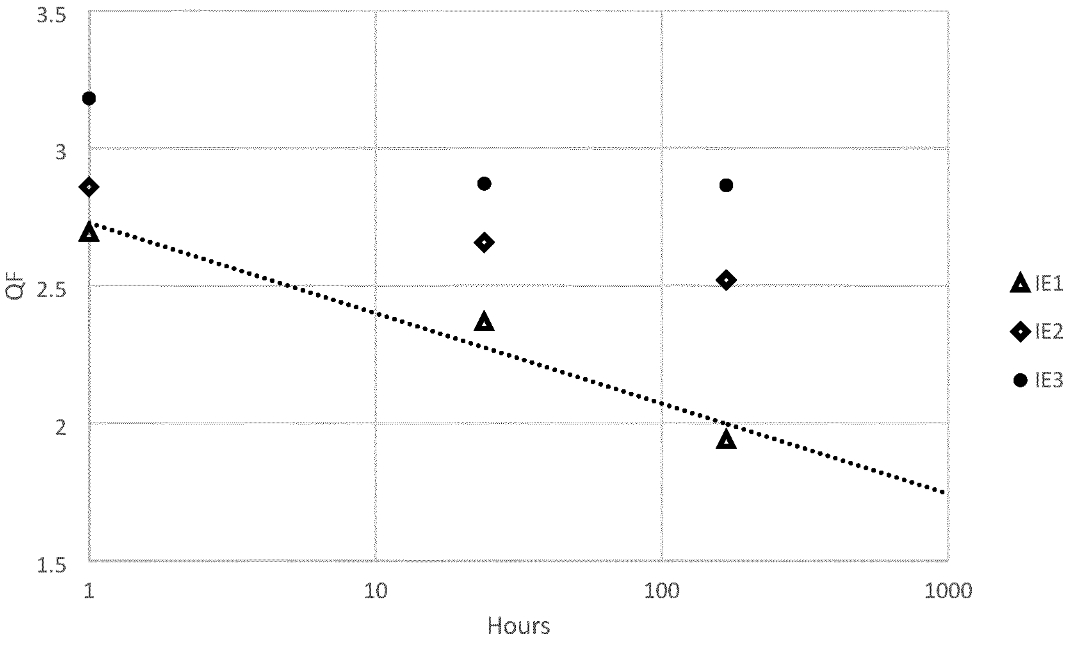
Figure 2: Quality factor of inventive electret melt-blown webs at 1, 24 and 168 hours after charging

ELECTRET MELT-BLOWN WEBS WITH IMPROVED FILTRATION PROPERTIES

FIELD OF THE INVENTION

The present invention relates to electret melt-blown webs comprising a polypropylene composition comprising a certain propylene homopolymer as well a process for forming the inventive electret melt-blown webs.

BACKGROUND TO THE INVENTION

A melt-blown web, being a non-woven structure consisting of melt-blown fibers, is typically made in a one-step process in which high-velocity air blows a molten thermoplastic resin from an extruder die tip onto a conveyor or take-up screen to form fine fibered self-bonding web. Although many types of polymers can be employed for melt-blown fibers and fabrics, polypropylene is one of the most commonly used polymers.

Melt-blown webs are often employed for their filtering properties. Whilst optimized filtration properties are of high importance in a number of long-established fields, they are increasingly critical since the spread of the COVID-19 pandemic, with facemasks having beneficial filtering properties particularly valuable. In this context, and indeed in most applications, beneficial filtering properties include having a high filtration efficiency (i.e. remove a high proportion of particles) and a low pressure drop (i.e. allowing gasses such as air to pass through the filter relative easily, enabling the user of a facemask to breath more easily).

Facemasks having particularly high filtration efficiency, such as N95 masks, often involve polypropylene melt-blown webs that have been electrostatically charged. Polypropylene is a natural electret, meaning that it is able to support a permanent electric dipole due to its dielectric properties. Electrostatically charged filters have noticeably increased filtration efficiency without an accompanying jump in the pressure drop.

Whilst the choice of additives and the choice of charging method are known to influence the performance of electret melt-blown webs, a further choice that is of crucial importance is the choice of the polypropylene base material. Typically, Ziegler-Natta polymerized polypropylenes are used in electret melt blown-webs, whereas the field of metallocene-polymerized polypropylenes is underexplored.

At high filtration efficiencies (such as those achieved by electret melt-blown webs), even minor improvements in the filtration efficiency can be of huge importance, since a small relative change close to 100% efficiency will have a far greater change on the number of particles passing through the filter (i.e. 100−efficiency). Furthermore, the ability to improve the properties simply by selecting an appropriate polypropylene would be of great benefit when combined with developments in the other technologies involved in manufacturing such filters, contributing to a product best able to meet the increasing demands in the field of filtration, both in view of the ongoing COVID-19 pandemic and the significant interest in this field that predates the pandemic.

As such, electret melt-blown webs that have improved properties due to the selection of an appropriate polypropylene are especially needed at present.

SUMMARY OF THE INVENTION

The present invention is based upon the finding that certain propylene homopolymers are particularly beneficial for the purposes of producing electret melt-blown webs with beneficial filtration properties.

The present invention is consequently directed to electret melt-blown webs made from a polypropylene composition (PC) comprising a propylene homopolymer (HPP) having:

a. a melt flow rate $MFR_2$, determined according to ISO 1133 at 230° C. at a load of 2.16 kg, in the range from 400 to 5000 g/10 min;
b. a melting temperature Tm, determined by differential scanning calorimetry (DSC) according to ISO 11357, in the range from 140 to 160° C.; and
c. a content of 2,1 erythro regiodefects, as determined by $^{13}$C-NMR spectroscopy, in the range from 0.01 to 1.5 mol %, more preferably 0.30 to 0.80 mol %.

In a particularly preferred aspect, the polypropylene composition (PC) comprises:

a. from 95.0 to 99.995 wt.-%, based on the total weight of the composition, of the propylene homopolymer (HPP); and
b. from 0.005 to 5.0 wt.-%, based on the total weight of the composition, of a charge-stabilizing agent.

In another aspect, the present invention is directed to a process for the preparation of electrostatically charged melt-blown webs of the present invention, comprising the steps of i. providing a propylene homopolymer (HPP) or a precursor propylene homopolymer (HPP');
ii. optionally providing a visbreaking agent, preferably a peroxide radical generator;
iii. optionally providing a charge-stabilizing agent;
iv. pelletizing either the precursor propylene homopolymer (HPP'), visbreaking agent and optionally charge-stabilizing agent or the propylene homopolymer (HPP) and optionally charge-stabilizing agent in a pelletizer to obtain the polypropylene composition (PC);
v. melt-blowing the blended pellets obtained in step (iv); and
vi. electrostatically charging the melt-blown web obtained in step (v) to obtain an electret melt-blown web.

Definitions

A propylene homopolymer is a polymer that essentially consists of propylene monomer units. Due to impurities especially during commercial polymerization processes, a propylene homopolymer can comprise up to 1.0 mol % comonomer units, preferably up to 0.5 mol % comonomer units, more preferably up to 0.1 mol % comonomer units, yet more preferably up to 0.05 mol % comonomer units and most preferably up to 0.01 mol % comonomer units. It is particularly preferred that propylene is the only detectable monomer. A propylene random copolymer is a copolymer of propylene monomer units and comonomer units, preferably selected from ethylene and C4-C12 alpha-olefins, in which the comonomer units are distributed randomly over the polymeric chain. A propylene random copolymer can comprise comonomer units from one or more comonomers different in their amounts of carbon atoms. In the following, amounts are given in % by weight (wt.-%) unless it is stated otherwise.

An electret is a dielectric material that has a quasi-permanent electrostatic charge or dipole polarization. This may be envisaged as being the electrostatic equivalent of a permanent magnet. In the context of the present invention, electrets are identified as any material that bears a quasi-permanent electrostatic charge, i.e. is electrostatically charged. The phrase "is electrostatically charged" when used in the context of the present invention does not indicate how the charge was generated, but that the material possesses an electrostatic charge, as opposed to bearing a charge that results from ion-containing components such as metal salts or cationic or anionic comonomers in a polyolefin. The electrostatic charge can be introduced by a number of methods known to the person skilled in the art, including but not limited to, electrostatic spinning, corona charging, tribocharging, hydro-charging or in an electrical field.

DETAILED DESCRIPTION

The Propylene Homopolymer (HPP)

The propylene homopolymer (HPP) has a melt flow rate $MFR_2$, determined according to ISO 1133 at 230° C. at a load of 2.16 kg, in the range from 400 to 5000 g/10 min, more preferably in the range from 500 to 3000 g/10 min, yet more preferably in the range from 600 to 2000 g/10 min, most preferably in the range from 700 to 1500 g/10 min.

The precursor propylene homopolymer (HPP'), from which the propylene homopolymer (HPP) has been formed, has been polymerized in the presence of a metallocene catalyst. Metallocene-catalysed polypropylene is typified by relatively low melting points and the presence of 2,1 erythro regiodefects, as well as often high isotactic pentad concentration (mmmm).

The propylene homopolymer (HPP) has a melting temperature Tm, determined by differential scanning calorimetry (DSC) according to ISO 11357, in the range from 140 to 160° C., more preferably in the range from 150 to 159° C., most preferably in the range from 152 to 158° C.

The propylene homopolymer (HPP) has a content of 2,1 erythro regiodefects, as determined by $^{13}C$-NMR spectroscopy, in the range from 0.01 to 1.5 mol %, more preferably in the range from 0.10 to 1.2 mol %, yet more preferably in the range from 0.20 to 1.0 mol %, still more preferably in the range from 0.30 to 0.80 mol %, most preferably in the range from 0.40 to 0.70 mol %.

In one particularly preferred embodiment, the propylene homopolymer (HPP) has a content of 2,1 erythro regiodefects, as determined by $^{13}C$-NMR spectroscopy, in the range from 0.50 to 1.5 mol %, more preferably in the range from 0.50 to 1.2 mol %, yet more preferably in the range from 0.50 to 1.0 mol %, still more preferably in the range from 0.50 to 0.80 mol %, most preferably in the range from 0.50 to 0.70 mol %.

It is also preferred that the propylene homopolymer (HPP) has an isotactic pentad concentration (mmmm), as determined by $^{13}C$-NMR spectroscopy, in the range from 95.0 to 100.0%, more preferably in the range from 97.0 to 99.99%, most preferably in the range from 98.0 to 99.9%.

The propylene homopolymer (HPP) is further characterised by its molecular weight properties.

It is preferred that the propylene homopolymer (HPP) has a molecular weight distribution (Mw/Mn), determined by Gel Permeation Chromatography in the range from 1.0 to 5.0, more preferably in the range from 1.2 to 4.0, most preferably in the range from 1.5 to 3.0.

It is preferred that the propylene homopolymer (HPP) has a weight average molecular weight Mw, determined by Gel Permeation Chromatography, in the range from 25,000 to 85,000, more preferably in the range from 35,000 to 80,000, most preferably in the range from 45,000 to 75,000.

It is preferred that the propylene homopolymer (HPP) has a xylene soluble content (XCS), determined at 25° C. according ISO 16152, in the range from 0.1 to 4.0 wt.-%, more preferably in the range from 0.2 to 3.0 wt.-%, most preferably in the range from 0.5 to 2.0 wt.-%.

All given properties of the propylene homopolymer (HPP) refer to the propylene homopolymer (HPP) as it is present in the polypropylene composition (PC), i.e. after visbreaking, if visbreaking has taken place.

The propylene homopolymer (HPP) is preferably obtained by visbreaking a precursor propylene homopolymer (HPP').

The visbreaking may be carried out using any known visbreaking technology; however, it is preferred that a visbreaking agent is employed. Preferably, the visbreaking agent used in this process is a peroxide radical generator.

Typical peroxide radical generators are 2,5-dimethyl-2,5-bis(tert-butylperoxy)hexane (DHBP) (for instance sold under the tradenames Luperox 101 and Trigonox 101), 2,5-dimethyl-2,5-bis(tert-butylperoxy)3-hexyne (DYBP) (for instance sold under the tradenames Luperox 130 and Trigonox 145), dicumyl peroxide (DCUP) (for instance sold under the tradenames Luperox DC and Perkadox BC), ditert-butyl peroxide (DTBP) (for instance sold under the tradenames Trigonox B and Luperox Di), tert-butylcumyl peroxide (BCUP) (for instance sold under the tradenames Trigonox T and Luperox 801) and bis(tert-butylperoxyisopropyl)benzene (DIPP) (for instance sold under the tradenames Perkadox 14S and Luperox DC).

Preferred peroxides are 2,5-dimethyl-2,5-bis(tert-butylperoxy)hexane (DHBP) and tert-butylcumyl peroxide (BCUP).

It is within the scope of the present invention to use either one specific peroxide or mixtures of different peroxides.

The precursor propylene homopolymer (HPP') preferably has a melt flow rate $MFR_2$, determined according to ISO 1133 at 230° C. at a load of 2.16 kg, is in the range from 50 to 399 g/10 min, more preferably in the range from 75 to 300 g/10 min, most preferably in the range from 100 to 250 g/10 min.

The precursor propylene homopolymer (HPP') preferably has a melting temperature Tm, determined by differential scanning calorimetry (DSC) according to ISO 11357, in the range from 140 to 160° C., more preferably in the range from 150 to 159° C., most preferably in the range from 152 to 158° C.

The precursor propylene homopolymer (HPP') has a content of 2,1 erythro regiodefects, as determined by $^{13}C$-NMR spectroscopy, in the range from 0.10 to 1.2 mol %, more preferably in the range from 0.20 to 0.90 mol %, most preferably in the range from 0.30 to 0.80 mol %.

In one particularly preferred embodiment, the precursor propylene homopolymer (HPP') has a content of 2,1 erythro regiodefects, as determined by $^{13}C$-NMR spectroscopy, in the range from 0.50 to 1.5 mol %, more preferably in the range from 0.50 to 1.2 mol %, yet more preferably in the range from 0.50 to 1.0 mol %, still more preferably in the range from 0.50 to 0.80 mol %, most preferably in the range from 0.50 to 0.70 mol %.

It is also preferred that the precursor propylene homopolymer (HPP') has an isotactic pentad concentration (mmmm), as determined by $^{13}C$-NMR spectroscopy, in the range from 95.0 to 100.0%, more preferably in the range from 97.0 to 99.99%, most preferably in the range from 98.0 to 99.9%.

It is preferred that the precursor propylene homopolymer (HPP') has a molecular weight distribution (Mw/Mn), determined by Gel Permeation Chromatography in the range from 2.0 to 6.0, more preferably in the range from 2.2 to 5.0, most preferably in the range from 2.5 to 4.0.

It is preferred that the precursor propylene homopolymer (HPP') has a weight average molecular weight Mw, determined by Gel Permeation Chromatography, in the range from 50,000 to 140,000, more preferably in the range from 70,000 to 130,000, most preferably in the range from 80,000 to 120,000.

It is preferred that the precursor propylene homopolymer (HPP') has a xylene soluble content (XCS), determined at 25° C. according ISO 16152, in the range from 0.1 to 4.0 wt.-%, more preferably in the range from 0.2 to 3.0 wt.-%, most preferably in the range from 0.5 to 2.0 wt.-%.

By visbreaking the precursor propylene homopolymer (HPP') according to the present invention, the molar mass distribution (Mw/Mn) becomes narrower because the long molecular chains are more easily broken up or scissored and the molar mass M will decrease, corresponding to a $MFR_2$ increase.

Therefore, it is further preferred that the molecular weight ($M_w$) ratio of the $M_w$ of the propylene homopolymer (HPP) to the $M_w$ of the precursor propylene homopolymer (HPP'), [$M_w$(HPP)/$M_w$(HPP')] is <1, preferably ≤0.90, more preferably ≤0.85, still more preferably ≤0.80.

Similarly, the molecular weight distribution (Mw/Mn or MWD) ratio of the propylene homopolymer (HPP) to the molecular weight distribution (Mw/Mn or MWD) of the precursor propylene homopolymer (HPP'), [MWD(HPP)/MWD(HPP')] is <1, preferably ≤0.95, more preferably ≤0.90, still more preferably ≤0.85, and most preferably ≤0.80.

The visbreaking ratio is defined as the melt flow rate $MFR_2$ of the propylene homopolymer (HPP), divided by the melt flow rate $MFR_2$ of the precursor propylene homopolymer (HPP'), wherein each melt flow rate $MFR_2$ is determined according to ISO 1133 at 230° C. at a load of 2.16 kg.

It is preferred that the visbreaking ratio is in the range from 3.0 to 40, more preferably in the range from 3.5 to 20, most preferably in the range from 4.0 to 10.

In addition to the effects on the molecular weight distribution, the skilled person would be able to ascertain whether the propylene homopolymer (HPP) is obtained via visbreaking by identifying the decomposition products of the visbreaking agent, more preferably peroxide decomposition products.

The precursor propylene homopolymer (HPP'), may be selected from commercially available polypropylene grades, or may be polymerized according to the following process.

Process for Forming the Precursor Propylene Homopolymer (HPP') or Non-Visbroken Propylene Homopolymer (HPP)

The propylene homopolymer (HPP) or the precursor propylene homopolymer (HPP') is preferably produced by a single- or multistage process polymerization of propylene such as bulk polymerization, gas phase polymerization, slurry polymerization, solution polymerization or combinations thereof. Preferably, the precursor propylene homopolymer (HPP') can be made in a combination of loop and gas phase reactor. Those processes are well known to one skilled in the art.

A preferred multistage process is a "loop-gas phase"-process, such as developed by Borealis (known as BORSTAR® technology) described e.g. in patent literature, such as in EP 0 887 379, WO 92/12182, WO 2004/000899, WO 2004/111095, WO 99/24478, WO 99/24479 or in WO 00/68315.

A further suitable slurry-gas phase process is the Spheripol® process of Basell.

The catalyst used in the polymerization process may be any suitable metallocene catalyst for the polymerization of polypropylene.

The catalyst used in the polymerization process is preferably a metallocene catalyst complex according to formula (I):

(I)

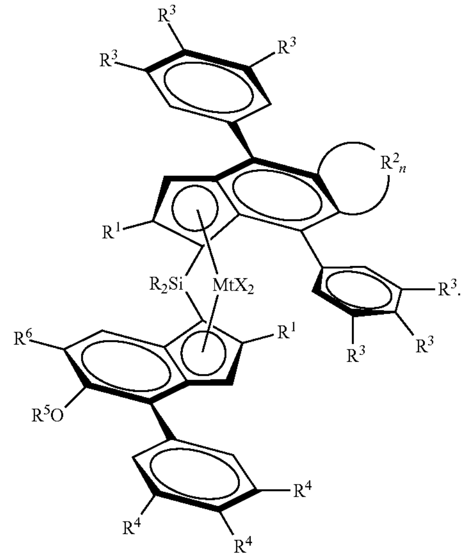

In a complex of formula (I) it is preferred that Mt is Zr or Hf, preferably Zr.

Each X is a sigma ligand. Most preferably, each X is independently a hydrogen atom, a halogen atom, $C_{1-6}$ alkoxy group or an R' group, where R' is a $C_{1-6}$ alkyl, phenyl or benzyl group. Most preferably, X is chlorine, benzyl or a methyl group. Preferably, both X groups are the same. The most preferred options are two chlorides, two methyl or two benzyl groups, especially two chlorides.

In the formula $-SiR_2-$, each R is independently a $C_1$-$C_{20}$-hydrocarbyl, $C_6$-$C_{20}$-aryl, $C_7$-$C_20$-arylalkyl or $C_7$-$C_{20}$-alkylaryl. The term $C_{1-20}$ hydrocarbyl group therefore includes $C_{1-20}$ alkyl, $C_{2-20}$ alkenyl, $C_{2-20}$ alkynyl, $C_{3-20}$ cycloalkyl, $C_{3-20}$ cycloalkenyl, $C_{6-20}$ aryl groups, $C_{7-20}$ alkylaryl groups or $C_{7-20}$ arylalkyl groups or of course mixtures of these groups such as cycloalkyl substituted by alkyl. Unless otherwise stated, preferred $C_{1-20}$ hydrocarbyl groups are $C_{1-20}$ alkyl, $C_{4-20}$ cycloalkyl, $C_{5-20}$ cycloalkyl-alkyl groups, $C_{7-20}$ alkylaryl groups, $C_{7-20}$ arylalkyl groups or $C_{6-20}$ aryl groups.

Preferably, both R groups are the same. It is preferred that R is a $C_1$-$C_{10}$-hydrocarbyl or $C_6$-$C_{10}$-aryl group, such as methyl, ethyl, propyl, isopropyl, tertbutyl, isobutyl, $C_{5-6}$-cycloalkyl, cyclohexylmethyl, phenyl or benzyl, more preferably both R are a $C_1$-$C_6$-alkyl, $C_{3-8}$ cycloalkyl or $C_6$-aryl group, such as a $C_1$-$C_4$-alkyl, $C_{5-6}$ cycloalkyl or $C_6$-aryl group and most preferably both R are methyl or one is methyl and another cyclohexyl. Most preferably the bridge is $-Si(CH_3)_2-$.

Each $R^1$ independently are the same or can be different and are a $CH_2$—$R^7$ group, with $R^7$ being H or linear or branched $C_{1-6}$-alkyl group, like methyl, ethyl, n-propyl, i-propyl, n-butyl, i-butyl, sec.-butyl and tert.-butyl or $C_{3-8}$ cycloalkyl group (e.g. cyclohexyl), $C_{6-10}$ aryl group (preferably phenyl).

Preferably, both $R^1$ are the same and are a $CH_2$—$R^7$ group, with $R^7$ being H or linear or branched $C_1$-$C_4$-alkyl group, more preferably, both $R^1$ are the same and are a $CH_2$—$R^7$ group, with $R^7$ being H or linear or branched $C_1$-$C_3$-alkyl group. Most preferably, both $R^1$ are both methyl.

Each $R^2$ is independently a —CH═, —CY═, —$CH_2$—, —CHY— or —$CY_2$— group, wherein Y is a $C_{1-10}$ hydrocarbyl group, preferably a $C_{1-4}$ hydrocarbyl group and where n is 2-6, preferably 3-4.

Each substituent $R^3$ and $R^4$ are independently the same or can be different and are hydrogen, a linear or branched $C_1$-$C_6$-alkyl group, an OY group or a $C_{7-20}$ arylalkyl, $C_{7-20}$ alkylaryl group or $C_{6-20}$ aryl group, preferably hydrogen, a linear or branched $C_1$-$C_6$-alkyl group or $C_{6-20}$ aryl groups, and optionally two adjacent $R^3$ or $R^4$ groups can be part of a ring including the phenyl carbons to which they are bonded. More preferably, $R^3$ and $R^4$ are hydrogen or a linear or branched $C_1$-$C_4$ alkyl group or a OY-group, wherein Y is a is a $C_{1-4}$ hydrocarbyl group. Even more preferably, each $R^3$ and $R^4$ are independently hydrogen, methyl, ethyl, isopropyl, tert-butyl or methoxy, especially hydrogen, methyl or tert-butyl, whereby at least one $R^3$ per phenyl group and at least one $R^4$ is not hydrogen.

Thus, preferably one or two $R^3$ per phenyl group are not hydrogen, more preferably on both phenyl groups the $R^3$ are the same, like 3',5'-di-methyl or 4'-tert.-butyl for both phenyl groups.

For the indenyl moiety preferably one or two $R^4$ on the phenyl group are not hydrogen, more preferably two $R^4$ are not hydrogen and most preferably these two $R^4$ are the same like 3',5'-di-methyl or 3',5'-di-tert.-butyl.

$R^5$ is a linear or branched $C_1$-$C_6$-alkyl group such as methyl, ethyl, n-propyl, i-propyl, n-butyl, i-butyl, sec.-butyl and tert.-butyl, $C_{7-20}$ arylalkyl, $C_{7-20}$ alkylaryl group or $C_6$-$C_{20}$ aryl group.

$R^5$ is a preferably a linear or branched $C_1$-$C_6$ alkyl group or $C_{6-20}$ aryl group, more preferably a linear $C_1$-$C_4$ alkyl group, even more preferably a $C_1$-$C_2$ alkyl group and most preferably methyl.

$R^6$ is a $C(R^8)_3$ group, with $R^8$ being a linear or branched $C_1$-$C_6$ alkyl group.

Each R is independently a $C_1$-$C_{20}$-hydrocarbyl, $C_6$-$C_{20}$-aryl, $C_7$-$C_{20}$-arylalkyl or C7-$C_{20}$-alkylaryl. Preferably each $R^8$ are the same or different with $R^8$ being a linear or branched $C_1$-$C_4$-alkyl group, more preferably with $R_8$ being the same and being a $C_1$-$C_2$-alkyl group. Most preferably, all $R^8$ groups are methyl.

In a preferred embodiment, the invention provides a metallocene catalyst complex of formula (Ia):

(Ia)

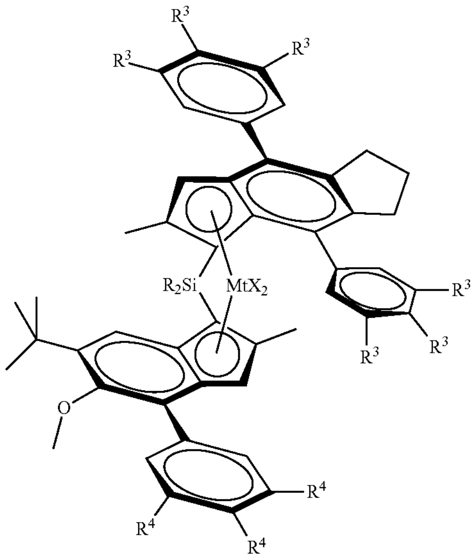

wherein each $R^3$ and $R^4$ are independently the same or can be different and are hydrogen or a linear or branched $C_1$-$C_6$-alkyl group, whereby at least on $R^3$ per phenyl group and at least one $R^4$ is not hydrogen.

Especially preferred metallocene catalyst complexes include:

rac-anti-dimethylsilanediyl[2-methyl-4,8-bis-(4'-tert-butylphenyl)-1,5,6,7-tetrahydro-s-indacen-1-yl][2-methyl-4-(3',5'-dimethyl-phenyl)-5-methoxy-6-tert-butylinden-1-yl]zirconium dichloride rac-anti-dimethylsilanediyl[2-methyl-4,8-bis-(3',5'-dimethylphenyl)-1,5,6,7-tetrahydro-s indacen-1-yl] [2-methyl-4-(3',5'-dimethylphenyl)-5-methoxy-6-tert-butylinden-1-yl] zirconium dichloride rac-anti-dimethylsilanediyl[2-methyl-4,8-bis-(3',5'-dimethylphenyl)-1,5,6,7-tetrahydro-s-indacen-1-yl][2-methyl-4-(3',5'-ditert-butyl-phenyl)-5-methoxy-6-tert-butylinden-1-yl]zirconium dichloride or their corresponding zirconium dimethyl analogues.

Throughout the disclosure above, where a narrower definition of a substituent is presented, that narrower definition is deemed disclosed in conjunction with all broader and narrower definitions of other substituents in the application.

To form an active catalytic species it is normally necessary to employ a cocatalyst as is well known in the art.

According to the present invention a cocatalyst system comprising a boron containing cocatalyst and an aluminoxane cocatalyst is used in combination with the above defined metallocene catalyst complex.

The aluminoxane cocatalyst can be one of formula (II):

(II)

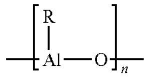

where n is from 6 to 20 and R has the meaning below.

Aluminoxanes are formed on partial hydrolysis of organo-aluminum compounds, for example those of the formula $AlR_3$, $AlR_2Y$ and $Al_2R_3Y_3$ where R can be, for example, C1-C10-alkyl, preferably C1-C5-alkyl, or C3-C10-cycloalkyl, C7-C12-arylalkyl or -alkylaryl and/or phenyl or naphthyl, and where Y can be hydrogen, halogen, preferably chlorine or bromine, or C1-C10-alkoxy, preferably methoxy or ethoxy. The resulting oxygen-containing aluminoxanes are not in general pure compounds but mixtures of oligomers of the formula (II).

The preferred aluminoxane is methylaluminoxane (MAO). Since the aluminoxanes used according to the invention as cocatalysts are not, owing to their mode of preparation, pure compounds, the molarity of aluminoxane solutions hereinafter is based on their aluminium content.

Preferred boron containing cocatalysts for use in the invention include borates, in particular borates comprising the trityl, i.e. triphenylcarbenium, ion. Thus, the use of $Ph_3CB(PhF_5)_4$ or analogues thereof is especially favoured.

The metallocene catalyst complex can be used in combination with a suitable cocatalyst as a catalyst for the polymerization of propylene, e.g. in a solvent such as toluene or an aliphatic hydrocarbon, (i.e. for polymerization in solution), as it is well known in the art. Preferably, polymerization of propylene takes place in the condensed phase or in gas phase.

The metallocene catalyst complex can be used in supported or unsupported form. The particulate support material used is preferably an organic or inorganic material, such as silica, alumina or zirconia or a mixed oxide such as silica-alumina, in particular silica, alumina or silica-alumina. The use of a silica support is preferred. The skilled man is aware of the procedures required to support a metallocene catalyst.

Especially preferably, the support is a porous material so that the complex may be loaded into the pores of the support, e.g. using a process analogous to those described in WO94/14856, WO95/12622 and WO2006/097497. The particle size is not critical but is preferably in the range 5 to 200 μm, more preferably 20 to 80 μm. The use of these supports is routine in the art.

In an alternative embodiment, no support is used at all. Such a catalyst can be prepared in solution, for example in an aromatic solvent like toluene, by contacting the metallocene (as a solid or as a solution) with the cocatalyst, for example methylaluminoxane and a borane or a borate salt previously dissolved in an aromatic solvent, or can be prepared by sequentially adding the dissolved catalyst components to the polymerization medium.

In one embodiment, no external carrier is used but the catalyst is still presented in solid particulate form. Thus, no external support material, such as inert organic or inorganic carrier, for example silica as described above is employed.

In order to provide the catalyst in solid form but without using an external carrier, it is preferred if a liquid/liquid emulsion system is used. The process involves forming dispersing catalyst components (i) and (ii) in a solvent, and solidifying said dispersed droplets to form solid particles.

In particular, the method involves preparing a solution of one or more catalyst components; dispersing said solution in an solvent to form an emulsion in which said one or more catalyst components are present in the droplets of the dispersed phase; immobilizing the catalyst components in the dispersed droplets, in the absence of an external particulate porous support, to form solid particles comprising the said catalyst, and optionally recovering said particles.

This process enables the manufacture of active catalyst particles with improved morphology, e.g. with a predetermined spherical shape, surface properties and particle size and without using any added external porous support material, such as an inorganic oxide, e.g. silica. By the term "preparing a solution of one or more catalyst components" is meant that the catalyst forming compounds may be combined in one solution, which is dispersed to the immiscible solvent, or, alternatively, at least two separate catalyst solutions for each part of the catalyst forming compounds may be prepared, which are then dispersed successively to the solvent.

Full disclosure of the necessary process can be found in WO03/051934, which is herein incorporated by reference.

This process is industrially advantageous, since it enables the preparation of the solid particles to be carried out as a one-pot procedure. Continuous or semicontinuous processes are also possible for producing the catalyst.

The Charge-Stabilizing Agent

In some embodiments, the propylene composition (PC) further comprises a charge-stabilizing agent.

The charge-stabilizing agent is preferably selected from metal salts of alkylcarboxylic acids having from 6 to 30 carbon atoms, hindered amine compounds, hindered phenol compounds, sulphur compounds, phosphorus compounds and aromatic bis- or trisamides, more preferably selected from metal salts of alkylcarboxylic acids having from 10 to 25 carbon atoms polymeric hindered amine compounds, organic phosphonate salts and aromatic bis- or trisamides, yet more preferably selected from metal salts of alkylcarboxylic acids having from 15 to 20 carbon atoms and aromatic bis- or trisamides, most preferably magnesium stearate or 1,3,5,-tris(2,2-dimethylpropanamido)benzene.

In one particularly preferred embodiment, the charge-stabilizing agent is selected from alkyl carboxylic acids having from 6 to 30 carbon atoms, more preferably selected from metal salts of alkyl carboxylic acids having from 10 to 25 carbon atoms, yet more preferably selected from metal salts of alkylcarboxylic acids having from 15 to 20 carbon atoms, most preferably magnesium stearate.

In this embodiment, the charge-stabilizing agent is preferably present in the polypropylene composition (PC) in an amount in the range from 0.02 to 5.0 wt.-%, relative to the total weight of the composition, more preferably in the range from 0.04 to 1.0 wt.-%, most preferably in the range from 0.05 to 0.50 wt.-%.

In another particularly preferred embodiment, the charge-stabilizing agent is selected from aromatic bis- or trisamides, most preferably 1,3,5,-tris(2,2-dimethylpropanamido)benzene.

In this embodiment, the charge-stabilizing agent is preferably present in the polypropylene composition (PC) in an amount in the range from 0.005 to 1.0 wt.-%, relative to the total weight of the composition, more preferably in the range from 0.005 to 0.10 wt.-%, most preferably in the range from 0.006 to 0.05 wt.-%.

In another particularly preferred embodiment, the charge-stabilizing agent is selected from hindered amine compounds, more preferably polymeric hindered amine compounds, most preferably poly-{6-[(1,1,3,3-tetramethylbutyl)amino-1,3,5-triazine-2,4-diyl][(2,2,6,6-tetramethyl-4-piperidyl)imino]-1,6-hexanediyl[(2,2,6,6-tetramethyl-4-piperidyl)imino)}.

In this embodiment, the charge-stabilizing agent is preferably present in the polypropylene composition (PC) in an amount in the range from 0.02 to 5.0 wt.-%, relative to the total weight of the composition, more preferably in the range from 0.04 to 1.0 wt.-%, most preferably in the range from 0.05 to 0.50 wt.-%.

In another particularly preferred embodiment, the charge-stabilizing agent is selected from phosphorus compounds, more preferably organic phosphonate salts, most preferably (1,1-di-tert-butyl)-4-hydroxyphenyl)methyl) ethylphosphonate.

In this embodiment, the charge-stabilizing agent is preferably present in the polypropylene composition (PC) in an amount in the range from 0.02 to 5.0 wt.-%, relative to the total weight of the composition, more preferably in the range from 0.04 to 1.0 wt.-%, most preferably in the range from 0.05 to 0.50 wt.-%.

The Polypropylene Composition (PC)

The polypropylene composition (PC) according to the present invention comprises the propylene homopolymer (HPP).

Preferably, the polypropylene composition (PC) comprises in the propylene homopolymer in an amount in the range from 95.0 to 99.995 wt.-%, more preferably in the range from 98.0 to 99.995 wt.-%, more preferably in the range from 99.0 to 99.995 wt.-%, most preferably in the range from 99.5 to 99.995 wt.-%.

In the event that the polypropylene composition (PC) comprises a charge-stabilizing agent, the polypropylene composition (PC) of the present invention comprises:

a. from 95.0 to 99.995 wt.-%, based on the total weight of the composition, of the propylene homopolymer (HPP); and b. from 0.005 to 5.0 wt.-%, based on the total weight of the composition, of the charge-stabilizing agent.

More preferably, the polypropylene composition (PC) according to the present invention comprises:

a. from 98.0 to 99.995 wt.-%, based on the total weight of the composition, of the propylene homopolymer (HPP); and b. from 0.005 to 2.0 wt.-%, based on the total weight of the composition, of the charge-stabilizing agent.

Yet more preferably, the polypropylene composition (PC) according to the present invention comprises:

a. from 99.0 to 99.995 wt.-%, based on the total weight of the composition, of the propylene homopolymer (HPP); and b. from 0.005 to 1.0 wt.-%, based on the total weight of the composition, of the charge-stabilizing agent.

Most preferably, the polypropylene composition (PC) according to the present invention comprises:

a. from 99.5 to 99.995 wt.-%, based on the total weight of the composition, of the propylene homopolymer (HPP); and b. from 0.005 to 0.5 wt.-%, based on the total weight of the composition, of the charge-stabilizing agent.

The polypropylene composition of the present invention may comprise further components; however, it is preferred that the inventive polypropylene composition comprises as polymer components only the propylene homopolymer (HPP), as defined in the instant invention.

The remaining part up to 100.0 wt.-% may be accomplished by further additives known in the art; however, this remaining part shall be not more than 2.0 wt.-%, more preferably not more than 1.0 wt.-%, yet more preferably not more than 0.5 wt.-%, most preferably not more than 0.3 wt.-%, relative to the total weight of the polypropylene composition (PC).

The inventive polypropylene composition (PC) may comprise small amounts of additives selected from the group consisting of antioxidants, stabilizers, fillers, colorants, nucleating agents and antistatic agents. In general, they are incorporated during granulation of the powder product obtained in the polymerization.

Such additives are generally commercially available and are described, for example, in "Plastic Additives Handbook", pages 871 to 873, 5th edition, 2001 of Hans Zweifel.

The Electret Melt-Blown Webs

The present invention is directed to electret melt-blown webs made from the polypropylene composition (PC).

In the context of the present invention, the term "made from" indicates that the polypropylene and optional further components are fed into the melt-blowing apparatus for the formation of melt-blown webs.

In particular, it is preferred that the electret melt-blown webs comprise at least 80.0 wt.-%, preferably at least 85.0 wt.-%, more preferably at least 90.0 wt.-%, still more preferably at least 95.0 wt.-% based on the total weight of the melt-blown webs, most preferably consist of, of the polypropylene composition (PC) as defined above.

Thus, a further component may be present in the electret melt-blown webs according to the invention. Such further component is a further polymer, which is preferably also a polypropylene based polymer.

It is within the skill of an art skilled person to choose a suitable additional polymer in a way that the desired properties of the electret melt-blown webs are not negatively affected.

Preferably, the electret melt-blown webs according to the present invention have a weight per unit area in the range of 1 to 1000 $g/m^2$, more preferably in the range of 4 to 500 $g/m^2$, yet more preferably in the range of 7 to 250 $g/m^2$, still more preferably in the range of 8 to 200 $g/m^2$, most preferably in the range of 15 to 150 $g/m^2$.

Uncharged melt-blown webs can be electrostatically charged to make electret melt-blown webs. The electrostatic charging of the melt-blown web may be any method of electrostatic charging known to the person skilled in the art. Preferably, the melt-blown web is electrostatically charged via electrostatic spinning, corona charging, tribocharging, hydro-charging or in an electrical field, more preferably corona charging or in an electric field, most preferably in an electric field.

It is preferred that the electret melt-blown webs have a fractional efficiency, determined according to EN 1822-3 using a test filter area of 400 $cm^2$, measured 168 hours after charging, of at least 50.0%, more preferably at least 60.0%, yet more preferably at least 70.0%, most preferably at least 80.0%.

It is also preferred that the electret melt-blown webs have a quality factor (QF) calculated according to Formula (III):

$$QF = \frac{-\ln(1-FE)}{\Delta p} \times 100 \quad \text{(III)}$$

wherein the FE corresponds to the numerical value of the fractional efficiency determined according to EN 1822-3 using a test filter area of 400 $cm^2$, measured 168 hour after charging and $\Delta p$ corresponds to the pressure drop measured according to DIN ISO 9237 at an air speed of 500 mm/s, of at least 1.50, more preferably at least 1.80, yet more preferably at least 1.90, still more preferably at least 2.10, most preferably at least 2.40.

In embodiments wherein the polypropylene composition (PC) comprises a charge stabilizing agent, the electret melt-blown webs preferably have a filtration efficiency value, determined according to EN 1822-3 using a test filter area of 400 $cm^2$, measured 168 hours after charging of at least 90.0% of the value of the fractional efficiency, determined according to EN 1822-3 using a test filter area of 400 $cm^2$, measured 1 hour after charging, more preferably at least 95.0%, most preferably at least 97.0%.

The Process for Forming the Electret Melt-Blown Webs

The present invention is further directed to a process for the preparation of electrostatically charged melt-blown webs of the present invention, comprising the steps of:

i. providing a propylene homopolymer (HPP) or a precursor propylene homopolymer (HPP');
ii. optionally providing a visbreaking agent, preferably a peroxide radical generator;
iii. optionally providing a charge-stabilizing agent;
iv. pelletizing either the precursor propylene homopolymer (HPP'), visbreaking agent and optionally charge-stabilizing agent or the propylene homopolymer (HPP) and optionally charge-stabilizing agent, in a pelletizer to obtain the polypropylene composition (PC);
v. melt-blowing the blended pellets obtained in step (iv); and
vi. electrostatically charging the melt-blown web obtained in step (v) to obtain an electret melt-blown web.

If the propylene homopolymer (HPP) is not to be a visbroken propylene homopolymer, the process comprises the steps of:

i. providing a propylene homopolymer (HPP);
ii. optionally providing a charge-stabilizing agent;
iii. pelletizing the propylene homopolymer (HPP) and optionally charge-stabilizing agent in a pelletizer to obtain the polypropylene composition (PC);
iv. melt-blowing the blended pellets obtained in step (iv); and
v. electrostatically charging the melt-blown web obtained in step (v) to obtain an electret melt-blown web.

In one embodiment, the process comprises the steps of:

i. providing a propylene homopolymer (HPP);
ii. pelletizing the propylene homopolymer (HPP) in a pelletizer to obtain the polypropylene composition (PC);
iii. melt-blowing the blended pellets obtained in step (ii); and
iv. electrostatically charging the melt-blown web obtained in step (iii) to obtain an electret melt-blown web.

In a preferred embodiment, the process comprises the steps of:

i. providing a propylene homopolymer (HPP);
ii. providing a charge-stabilizing agent;
iii. pelletizing the propylene homopolymer (HPP) and charge-stabilizing agent in a pelletizer to obtain the polypropylene composition (PC);
iv. melt-blowing the blended pellets obtained in step (iv); and
v. electrostatically charging the melt-blown web obtained in step (v) to obtain an electret melt-blown web.

If the propylene homopolymer (HPP) is to be a visbroken propylene homopolymer, the process comprises the steps of:

i. providing a precursor propylene homopolymer (HPP');
ii. providing a visbreaking agent, preferably a peroxide radical generator;
iii. optionally providing a charge-stabilizing agent;
iv. pelletizing the precursor propylene homopolymer (HPP'), visbreaking agent and optionally charge-stabilizing agent in a pelletizer to obtain the visbroken polypropylene composition (PC);
v. melt-blowing the blended pellets obtained in step (iv); and
vi. electrostatically charging the melt-blown web obtained in step (v) to obtain an electret melt-blown web.

In one embodiment, the process comprises the steps of i. providing a precursor propylene homopolymer (HPP');
ii. providing a visbreaking agent, preferably a peroxide radical generator;
iii. pelletizing the precursor propylene homopolymer (HPP') and visbreaking agent in a pelletizer to obtain the visbroken polypropylene composition (PC);
iv. melt-blowing the blended pellets obtained in step (iii); and
v. electrostatically charging the melt-blown web obtained in step (iv) to obtain an electret melt-blown web.

In a preferred embodiment, the process comprises the steps of i. providing a precursor propylene homopolymer (HPP');
ii. providing a visbreaking agent, preferably a peroxide radical generator;
iii. providing a charge-stabilizing agent;
iv. pelletizing the precursor propylene homopolymer (HPP'), visbreaking agent and charge-stabilizing agent in a pelletizer to obtain the visbroken polypropylene composition (PC);
v. melt-blowing the blended pellets obtained in step (iv); and
vi. electrostatically charging the melt-blown web obtained in step (v) to obtain an electret melt-blown web.

The electrostatic charging of the melt-blown web in step (vi) may be any method of electrostatic charging known to the person skilled in the art. Preferably the melt-blown web is electrostatically charged via electrostatic spinning, corona charging, tribocharging, hydro-charging or in an electrical field, more preferably corona charging or in an electric field, most preferably in an electric field.

The melt-blowing of step (v) is not particularly limited, and can be any melt-blowing procedure known to the person skilled in the art.

It is preferred that the visbreaking agent is a peroxide radical generator. Typical peroxide radical generators are 2,5-dimethyl-2,5-bis(tert-butylperoxy)hexane (DHBP) (for instance sold under the tradenames Luperox 101 and Trigonox 101), 2,5-dimethyl-2,5-bis(tert-butylperoxy)3-hexyne (DYBP) (for instance sold under the tradenames Luperox 130 and Trigonox 145), dicumyl peroxide (DCUP) (for instance sold under the tradenames Luperox DC and Perkadox BC), ditert-butyl peroxide (DTBP) (for instance sold under the tradenames Trigonox B and Luperox Di), tert-butylcumyl peroxide (BCUP) (for instance sold under the tradenames Trigonox T and Luperox 801) and bis(tert-butylperoxyisopropyl)benzene (DIPP) (for instance sold under the tradenames Perkadox 14S and Luperox DC).

Preferred peroxides are 2,5-dimethyl-2,5-bis(tert-butylperoxy)hexane (DHBP) and tert-butylcumyl peroxide (BCUP).

It is within the scope of the present invention to use either one specific peroxide or mixtures of different peroxides.

The peroxide may be part of a masterbatch.

In the context of the present invention, "masterbatch" means a concentrated premix of a propylene polymer with an additive, in this case a free radical forming agent (peroxide).

The peroxide compound may preferably be contained in the peroxide masterbatch composition in a range of from 1 to 50 wt.-%, like from 5 to 40 wt.-%, based on the total composition of the masterbatch.

The charge-stabilizing agent may be part of a masterbatch.

In the context of the present invention, "masterbatch" means a concentrated premix of a propylene polymer with an additive, in this case the charge-stabilizing agent.

The charge stabilizing agent may preferably be contained in the masterbatch composition in a range of from 0.1 to 50 wt.-%, like from 0.5 to 20 wt.-%, based on the total composition of the masterbatch.

Examples

1. Definitions/Measuring Methods

The following definitions of terms and determination methods apply for the above general description of the invention as well as to the below examples unless otherwise defined.

$MFR_2$ (230° C.) was measured according to ISO 1133 (230° C., 2.16 kg load).

Quantification of Microstructure by NMR Spectroscopy

Quantitative nuclear-magnetic resonance (NMR) spectroscopy was used to quantify the comonomer content of the polymers. Quantitative $^{13}C\{^1H\}$ NMR spectra were recorded in the solution-state using a Bruker Advance III 400 NMR spectrometer operating at 400.15 and 100.62 MHz for $^1H$ and $^{13}C$, respectively. All spectra were recorded using a $^{13}C$ optimized 10 mm extended temperature probehead at 125° C. using nitrogen gas for all pneumatics. Approximately 200 mg of material was dissolved in 3 ml of 1,2-tetrachloroethane-$d_2$ (TCE-$_{d2}$) along with chromium-(III)-acetylacetonate ($Cr(acac)_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimized tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6 k) transients were acquired per spectra.

Quantitative $^{13}C\{^1H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

The comonomer fraction was quantified using the method of Wang et. al. (Wang, W-J., Zhu, S., Macromolecules 33 (2000), 1157) through integration of multiple signals across the whole spectral region in the $^{13}C\{^1H\}$ spectra. This method was chosen for its robust nature and ability to account for the presence of regiodefects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E = 0.5(S\beta\beta + S\beta\gamma + S\beta\delta + 0.5(S\alpha\beta + S\alpha\gamma))$$

Through the use of this set of sites the corresponding integral equation becomes:

$$E = 0.5(I_H + I_G + 0.5(I_C + I_D))$$

using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$$E\ [mol\ \%] = 100*fE$$

The weight percent comonomer incorporation was calculated from the mole fraction:

$$E[wt\,\%] = 100*(fE*28.06/((fE*28.06)+((1-fE)^{*}42.08))$$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

The xylene solubles (XCS, wt.-%): Content of xylene cold solubles (XCS) was determined at 25° C. according ISO 16152; first edition; 2005 Jul. 1

Number average molecular weight ($M_n$), weight average molecular weight ($M_w$) and molecular weight distribution ($M_w/M_n$) were determined by Gel Permeation Chromatography (GPC) according to the following method:

The weight average molecular weight $M_w$ and the molecular weight distribution ($M_w/M_n$), wherein $M_n$ is the number average molecular weight and $M_w$ is the weight average molecular weight) was measured by a method based on ISO 16014-1:2003 and ISO 16014-4:2003. A Waters Alliance GPCV 2000 instrument, equipped with refractive index detector and online viscosimeter was used with 3×TSK-gel columns (GMHXL-HT) from TosoHaas and 1,2,4-trichlorobenzene (TCB, stabilized with 200 mg/L 2,6-Di tert.-butyl-4-methyl-phenol) as solvent at 145° C. and at a constant flow rate of 1 mL/min. 216.5 μL of sample solution were injected per analysis. The column set was calibrated using relative calibration with 19 narrow MWD polystyrene (PS) standards in the range of 0.5 kg/mol to 11 500 kg/mol and a set of well characterized broad polypropylene standards. All samples were prepared by dissolving 5-10 mg of polymer in 10 mL (at 160° C.) of stabilized TCB (same as mobile phase) and keeping for 3 hours with continuous shaking prior sampling in into the GPC instrument.

DSC analysis, melting temperature ($T_m$) and heat of fusion ($H_f$), crystallization temperature ($T_c$) and heat of crystallization ($H_c$): measured with a TA Instrument Q2000 differential scanning calorimetry (DSC) on 5 to 7 mg samples. DSC was run according to ISO 11357/part 3/method C2 in a heat/cool/heat cycle with a scan rate of 10° C./min in the temperature range of −30 to +225° C. Crystallization temperature and heat of crystallization ($H_c$) are determined from the cooling step, while melting temperature and heat of fusion ($H_f$) are determined from the second heating step.

The glass transition temperature $T_g$ was determined by dynamic mechanical analysis according to ISO 6721-7. The measurements were done in torsion mode on compression molded samples (40×10×1 $mm^3$) between −100° C. and +150° C. with a heating rate of 2° C./min and a frequency of 1 Hz.

Grammage of the web: The unit weight (grammage) of the webs in $g/m^2$ was determined in accordance with ISO 536:1995.

Filtration efficiency: Air filtration efficiency was determined based on EN 1822-3 for flat sheet filter media, using a test filter area of 400 $cm^2$. The particle retention was tested with a usual aerosol of di-ethyl-hexyl-sebacate (DEHS), calculating efficiency for the fraction with 0.4 μm diameter from a class analysis with 0.1 μm scale. An airflow of 16 $m^3 \cdot h^{-1}$ was used, corresponding to an airspeed of 0.11 $m \cdot s^{-1}$.

Pressure drop (Δp): The pressure drop was measured according to DIN ISO 9237 at an air speed (permeability) of 500 mm/s.

Quality factor: The quality factor (QF) is calculated based on the formula:

$$QF = \frac{-\ln(1 - FE)}{\Delta p} \times 100$$

in which FE is the filtration efficiency for the particle size of 0.4 μm and Δp is the measured pressure drop in Pa.

2. Examples

The catalyst used in the polymerization process for the precursor propylene homopolymer (HPP') of the inventive and comparative examples was Anti-dimethylsilanediyl[2-methyl-4,8-di(3,5-dimethylphenyl)-1,5,6,7-tetrahydro-s-indacen-1-yl][2-methyl-4-(3,5-dimethylphenyl)-5-methoxy-6-tert-butylinden-1-yl] zirconium dichloride as disclosed in WO 2019/179959 A1 as MC-2 (hereafter termed "the metallocene") and was produced as follows:

Preparation of MAO-Silica Support

A steel reactor equipped with a mechanical stirrer and a filter net was flushed with nitrogen and the reactor temperature was set to 20° C. Next silica grade DM-L-303 from AGC Si-Tech Co, pre-calcined at 600° C. (5.0 kg) was added from a feeding drum followed by careful pressuring and depressurizing with nitrogen using manual valves. Then toluene (22 kg) was added. The mixture was stirred for 15 min. Next 30 wt.-% solution of MAO in toluene (9.0 kg) from Lanxess was added via feed line on the top of the reactor within 70 min. The reaction mixture was then heated up to 90° C. and stirred at 90° C. for additional two hours. The slurry was allowed to settle and the mother liquor was filtered off. The catalyst was washed twice with toluene (22 kg) at 90° C., following by settling and filtration. The reactor was cooled off to 60° C. and the solid was washed with heptane (22.2 kg). Finally MAO treated $SiO_2$ was dried at 60° under nitrogen flow for 2 hours and then for 5 hours under vacuum (−0.5 barg) with stirring. MAO treated support was collected as a free-flowing white powder found to contain 12.2% Al by weight.

Catalyst Synthesis 30 wt.-% MAO in toluene (0.7 kg) was added into a steel nitrogen blanked reactor via a burette at 20° C. Toluene (5.4 kg) was then added under stirring. The metallocene (93 g) was added from a metal cylinder followed by flushing with 1 kg toluene. The mixture was stirred for 60 minutes at 20° C. Trityl tetrakis(pentafluorophenyl) borate (91 g) was then added from a metal cylinder followed by a flush with 1 kg of toluene. The mixture was stirred for 1 h at room temperature. The resulting solution was added to a stirred cake of MAO-silica support prepared as described above over 1 hour. The cake was allowed to stay for 12 hours, followed by drying under $N_2$ flow at 60° C. for 2h and additionally for 5 h under vacuum (−0.5 barg) under stirring.

Dried catalyst was sampled in the form of pink free flowing powder containing 13.9% Al and 0.11% Zr.

Polymerization of HPP' and Subsequent Compounding Visbreaking

The polymerization conditions of HPP' used in the inventive examples are indicated in Table 1. The polymerization was carried on a Borstar pilot plant, with prepolymerizer, loop and first gas phase reactor connected sequentially, in the presence of the catalyst described above. The pellet properties given in Table 1 are for pellets wherein the polymer powder resulting from the polymerization reactors was compounded and pelletized with 1000 ppm of Irganox 1010 (Pentaerythritol tetrakis(3-(3,5-di-tert-butyl-4-hydroxyphenyl)propionate, CAS-no. 6683-19-8, an antioxidant commercially available from BASF SE (DE)) and 500 ppm of calcium stearate (CAS-no. 1592-23-0, commercially available from Faci, IT), using a ZSK 57 twin screw extruder, with a melt temperature of 190° C.

The preparation of the comparative and inventive examples, the polymer powder resulting from the polymerization reactors was compounded and pelletized with 1700 ppm of Trigonox 101 (2,5-dimethyl-2,5-bis(tert-butylperoxy)hexane, CAS-no. 78-63-7, a peroxide-based visbreaking agent commercially available from AkzoNobel, NL), as well as certain additives, using a ZSK 57 twin screw extruder, with a melt temperature of 190° C.

For Inventive Example 1 (IE1), the choice of additives was 1000 ppm of Irganox 1010 (Pentaerythritol tetrakis(3-(3,5-di-tert-butyl-4-hydroxyphenyl)propionate, CAS-no. 6683-19-8, an antioxidant commercially available from BASF SE (DE)) and 500 ppm of calcium stearate (CAS-no. 1592-23-0, commercially available from Faci, IT). The visbroken $MFR_2$ is measured as 656 g/10 min, the Mw is measured as 63,700, and the MWD (Mw/Mn) is measured as 2.74.

The additives used for Inventive Example 2 (IE2) were 1000 ppm of Irganox 1010, 500 ppm of calcium stearate and 5000 ppm of magnesium stearate (CAS-no. 557-04-0, commercially available from Faci, IT). The visbroken $MFR_2$ is measured as 718 g/10 min, the Mw is measured as 62,700, and the MWD (Mw/Mn) is measured as 2.74.

The additives used for Inventive Example 3 (IE3) were 1000 ppm of Irganox 1010, 500 ppm of calcium stearate and 100 ppm of Irgaclear XT386 (1,3,5,-tris(2,2-dimethylpropanamido)benzene, CAS-no. 745070-61-5, commercially available from BASF SE). The visbroken $MFR_2$ is measured as 810 g/10 min, the Mw is measured as 62,150, and the MWD (Mw/Mn) is measured as 2.74.

TABLE 1

Preparation of the precursor propylene homopolymer (HPP')

| | | HPP' |
|---|---|---|
| Prepoly reactor | | |
| Temperature | [° C.] | 20 |
| Pressure | [kPa] | 4693 |
| Residence time | [h] | 0.38 |
| Loop reactor | | |
| Temperature | [° C.] | 70 |
| Pressure | [kPa] | 4916 |
| $MFR_2$ | [g/10 min] | 117 |
| XCS | [wt.-%] | 0.5 |
| Feed $H_2/C_3$ ratio | [mol/kmol] | 0.41 |
| Split | [wt.-%] | 64 |
| GPR | | |
| Temperature | [° C.] | 75 |
| Pressure | [kPa] | 2400 |
| $MFR_2$ | [g/10 min] | 156 |
| $H_2/C_3$ ratio | [mol/kmol] | 3.7 |
| Split | [wt.-%] | 36 |
| Pellets | | |
| $MFR_2$ | [g/10 min] | 158 |
| XCS | [wt.-%] | 0.9 |
| $T_m$ | [° C.] | 155 |
| $T_c$ | [° C.] | 114 |
| $M_w$ | [kg/mol] | 103,500 |
| $M_w/M_n$ | [—] | 3.5 |
| mmmm | [%] | 98.5 |
| 2,1 erythro regiodefects | [mol %] | 0.6 |
| Tg below −20° C. | [° C.] | n.d. |
| Tg above −20° C. | [° C.] | 0 |

The visbroken, pelletized compositions were then converted into melt-blown webs on a Reicofil MG250 line using a spinneret having 460 holes of 0.4 mm exit diameter and 35 holes per inch. Throughput was 45 kg/h/m, the DCD (die to collector distance) was 200 mm, the melt temperature was 290° C. and the webs produced have a weight of 25 $g/m^2$.

The melt-blown webs thus obtained were the charged in an electric field directly after the collector. The generator used is KNH35/BNKO2 (produced and supplied by Eltex Elektrostatik GmbH), operated at 20 kV, the electrode is R131A3A/0975 (produced and supplied by Eltex Elektrostatik GmbH).

Comparative Example 1 (CE1) is identical to IE1, except that the melt-blown web has not undergone a charging step.

Comparative Example 2 (CE2) is an electret melt-blown web, prepared according to the method of the inventive examples, wherein Ziegler-Natta catalysed commercial polypropylene grade HL708FB ($MFR_2$ of 800 g/10 min, Tm of 158° C.) was used in place of the inventive polypropylene compositions. HL708FB has a melt flow rate $MFR_2$ of 800 g/10 min, a melting temperature Tm of 158° C., an XCS of 4.9 wt.-%, an isotactic pentad concentration (mmmm) of 93.5% and is free from 2,1 erythro regiodefects. HL708FB is prepared in the same manner as IE1 in WO 2015/082379 A1.

The properties of the comparative and inventive examples, measured 168 hours after charging are given Table 2.

TABLE 2

Properties of melt-blown webs (comparative and inventive examples)

| Example | Base polymer | Charged? | Charge-stabilizing agent? | FE | QF |
|---|---|---|---|---|---|
| CE1 | HPP | N | — | 34.67 | 0.65 |
| CE2 | HL708FB | Y | — | 71.97 | 1.89 |
| IE1 | HPP | Y | — | 73.46 | 1.94 |
| IE2 | HPP | Y | 5000 ppm MgSt | 83.10 | 2.52 |
| IE3 | HPP | Y | 100 ppm Irgaclear XT386 | 83.65 | 2.87 |

As can be seen from the data in Table 2, the FE and QF of IE1 are by far superior to those of CE1, showing the significant effect of charging the melt-blown webs. Furthermore, there is an unexpected improvement when using the inventive HPP as opposed to the Ziegler-Natta catalysed HL708FB (IE1 vs. CE2). Whilst this effect may appear to be minor, this difference is in fact significant considering that the only difference is the polypropylene base polymer.

As previously discussed, at the higher ends of FE and QF, small improvements in these values are increasingly difficult to achieve.

Table 2 further demonstrates that charge-stabilizing agents such as MgSt (IE2) and Irgaclear XT386 (IE3) can be used to improve the FE and QF properties of electret melt-blown webs.

The charge-stabilizing properties of FE and QF as a function of time can be seen from FIGS. 1 and 2 respectively, wherein the decay observed for the unstabilized IE1 is mitigated through the use of the charge-stabilizing agents. The FE values measured after 168 hours for IE2 and IE3 are 97% and 98% of their respective values measured one hour after charging, whereas IE1 has decayed to 89% of the value measured at 1 hour. Similar effects are seen for the QF values in FIG. 2, wherein IE2 and IE3 have decayed to 88% and 90% respectively in comparison to IE1, which has decayed to 72% of the value measured at 1 hour.

The invention claimed is:

1. Electret melt-blown webs made from a polypropylene composition (PC) comprising a propylene homopolymer (HPP), wherein the propylene homopolymer (HPP) has:

a melt flow rate $MFR_2$, determined according to ISO 1133 at 230° C. at a load of 2.16 kg, in the range from 400 to 5000 g/10 min;

a melting temperature Tm, determined by differential scanning calorimetry (DSC) according to ISO 11357, in the range from 140 to 160° C.; and a content of 2,1 erythro regiodefects, as determined by $^{13}C$-NMR spectroscopy, in the range from 0.50 to 1.5 mol %.

2. The electret melt-blown webs according to claim 1, wherein the propylene homopolymer (HPP) has a molecular weight distribution, determined by Gel Permeation Chromatography in the range from 1.0 to 5.0.

3. The electret melt-blown webs according to claim 1, wherein the propylene homopolymer (HPP) has a weight average molecular weight Mw, determined by Gel Permeation Chromatography, in the range from 25,000 to 85,000.

4. The electret melt-blown webs according to claim 1, wherein the propylene homopolymer (HPP) has been formed by visbreaking a precursor propylene homopolymer (HPP').

5. The electret melt-blown webs according to claim 4, wherein the visbreaking ratio is in the range from 3.0 to 40.0, calculated as the melt flow rate $MFR_2$ of the propylene homopolymer (HPP) divided by the melt flow rate $MFR_2$ of the precursor propylene homopolymer (HPP'), wherein the melt flow rate $MFR_2$ is determined according to ISO 1133 at 230° C. at a load of 2.16 kg.

6. The electret melt-blown webs according to claim 4, wherein the melt flow rate $MFR_2$, determined according to ISO 1133 at 230° C. at a load of 2.16 kg, of the precursor propylene homopolymer (HPP') that is visbroken to produce the propylene homopolymer (HPP) is in the range from 50 to 399 g/10 min.

7. The electret melt-blown webs according to claim 1, wherein the propylene homopolymer (HPP) has been polymerized in the presence of a metallocene catalyst complex of formula (I):

(I)

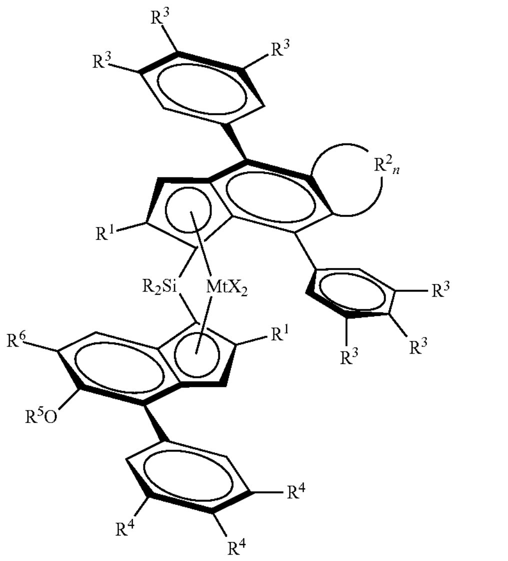

wherein

Mt is Hf or Zr;

each X is a sigma-ligand, each $R^1$ independently is the same or different and is a $CH_2$-$R^7$ group, with $R^7$ being H or linear or branched $C_{1-6}$-alkyl group, $C_{3-8}$ cycloalkyl group, or $C_{6-10}$ aryl group, each $R^2$ is independently a —CH═, —CY═, —$CH_2$—, —CHY— or —$CY_2$-group, wherein Y is a $C_{1-10}$ hydrocarbyl group and where n is 2-6, each $R^3$ and $R^4$ are independently the same or can be different and are hydrogen, a linear or branched $C_1$-$C_6$-alkyl group, an OY group or a $C_{7-20}$ arylalkyl, $C_{7-20}$ alkylaryl group or $C_{6-20}$ aryl group, whereby at least one $R^3$ per phenyl group and at least one $R^4$ is not hydrogen, and optionally two adjacent $R^3$ or $R^4$ groups can be part of a ring including the phenyl carbons to which they are bonded, $R^5$ is a linear or branched $C_1$-$C_6$-alkyl group, $C_{7-20}$ arylalkyl, $C_{7-20}$ alkylaryl group or $C_6$-$C_{20}$-aryl group, $R^6$ is a $C(R^8)_3$ group, with $R^8$ being a linear or branched $C_1$-$C_6$ alkyl group, each R is independently a $C_1$-$C_{20}$-hydrocarbyl, $C_6$-$C_{20}$-aryl, $C_7$-$C_{20}$-arylalkyl or $C_7$-$C_{20}$-alkylaryl.

8. The electret melt-blown webs according to claim 7, wherein in the formula (I)

Mt is Zr, each X is independently a chlorine, benzyl or a methyl group, each R is independently a $C_1$-$C_{10}$-hydrocarbyl or $C_6$-$C_{10}$-aryl group, both $R^1$ are the same and are a $CH_2$-$R^7$ group, with $R^7$ being H or linear or branched $C_1$-$C_3$-alkyl group, each R2 is independently a —CH═, —CY═, —$CH_2$—, —CHY⇒ or —$CY_2$-group, wherein Y is a $C_{1-4}$ hydrocarbyl group and where n is 3-4, each $R^3$ and $R^4$ are independently the same or can be different and are hydrogen, a linear or branched $C_1$-$C_6$-alkyl group or $C_{6-20}$ aryl groups, whereby at least one $R^3$ per phenyl group and at least one $R^4$ is not hydrogen, $R^5$ is a linear or branched $C_1$-$C_6$ alkyl group or $C_{6-20}$ aryl group, and $R^6$ is a $C(R^8)_3$ group, $R^8$ being the same and being a $C_1$-$C_2$-alkyl group.

9. The electret melt-blown webs according to claim 1, wherein the polypropylene composition (PC) comprises:

from 95.0 to 99.995 wt. %, based on the total weight of the composition, of the propylene homopolymer (HPP); and from 0.005 to 5.0 wt. %, based on the total weight of the composition, of a charge-stabilizing agent.

10. The electret melt-blown webs according to claim 9, wherein the charge-stabilizing agent is selected from metal salts of alkylcarboxylic acids having from 6 to 30 carbon atoms, hindered amine compounds, hindered phenol compounds, sulphur compounds, phosphorus compounds and aromatic bis-or trisamides.

11. The electret melt-blown webs according to claim 9, having a filtration efficiency value, determined according to EN 1822-3 using a test filter area of 400 $cm^2$, measured 168 hours after charging of at least 90.0% of the value of the filtration efficiency, determined according to EN 1822-3 using a test filter area of 400 $cm^2$, measured 1 hour after charging.

12. The electret melt-blown webs according to claim 1, having a filtration efficiency, determined according to EN 1822-3 using a test filter area of 400 $cm^2$, measured 168 hours after charging, of at least 50.0%.

13. The electret melt-blown webs according to claim 1, having a quality factor (QF) calculated according to Formula (III):

$$QF = \frac{-\ln(1 - FE)}{\Delta p} \times 100 \quad \text{(III)}$$

wherein the FE corresponds to the numerical value of the filtration efficiency determined according to EN 1822-3 using a test filter area of 400 $cm^2$, measured 168 hour after charging and Ap corresponds to the pressure drop measured according to DIN ISO 9237 at an air speed of 500 mm/s, of at least 1.50.

14. A process for the preparation of an electrostatically charged melt-blown web according to claim 1, comprising the steps of:

providing a propylene homopolymer (HPP) or a precursor propylene homopolymer (HPP');

optionally providing a visbreaking agent;

optionally providing a charge-stabilizing agent;

pelletizing either the precursor propylene homopolymer (HPP'), visbreaking agent and optionally charge-stabilizing agent or the propylene homopolymer (HPP) and optionally charge-stabilizing agent in a pelletizer to obtain the polypropylene composition (PC);

melt-blowing the blended pellets obtained in step (iv); and electrostatically charging the melt-blown web obtained in step (v) to obtain an electret melt-blown web.

15. The process according to claim 14, wherein the melt-blown web has been electrostatically charged via electrostatic spinning, corona charging, tribocharging, hydrocharging or direct charging in an electrical field.

* * * * *